June 19, 1962  A. C. VIBERT  3,039,200

GYROSCOPIC HORIZONS

Filed Dec. 17, 1956

Inventor
André Camille Vibert

By  Karl W. Flocks
Attorney

United States Patent Office 3,039,200
Patented June 19, 1962

3,039,200
GYROSCOPIC HORIZONS
André Camille Vibert, La Varenne, France, assignor to Société Française d'Equipements pour la Navigation Aérienne S.F.E.N.A., Neuilly, France, a French joint-stock company
Filed Dec. 17, 1956, Ser. No. 628,695
Claims priority, application France Feb. 9, 1956
1 Claim. (Cl. 33—204)

The present invention relates to improvements in gyroscopic horizons mounted on an instrument panel, of a type in which the attitude of the aircraft is shown by the relative position, observed through an aperture in the casing of the gyroscope mechanism, of a horizon-line located in a true horizontal plane embodied by a horizon gyroscope and of a model representing the aircraft.

With gyroscopic horizons of this type, it sometimes happens that the horizon-line can no longer be seen through the casing aperture, whenever the variations of the aircraft's attitude pitch are too pronounced. Under such conditions, these apparatus no longer give to the pilot means for ascertaining the attitude of the aircraft.

Moreover, in case the horizon-line is near the casing aperture and if the attitude pitch change coincides with a lateral tilt of the aircraft, it becomes difficult to make an accurate estimate of the pitch variation.

The object of the present invention is to provide improvements eliminating the above drawbacks, by maintaining within the casing aperature the same appearance of the horizon-line and of the model, whatever be the value of the attitude pitch angle.

These improvements according to the invention are essentially characterized by a body of revolution on the outer surface of which is drawn a scale constituted by a plurality of generatrices; a fork integral with the gimbal ring of said horizon gyroscope; a spindle adapted to rotate in the arms of said fork, parallel to the transverse spindle of said horizon gyroscope, said spindle mounted in the arms of the fork acting as a rotating spindle for said body of revolution; and connection means provided between the spindle of said body and the transverse spindle of said horizon gyroscope, whereby a given variation of the pitch angle of the aircraft causes a given rotation of the body of revolution about its spindle, the magnitude of this rotation being suitably amplified, and enables the pilot to ascertain what is the attitude of the aircraft, whatever be the amplitude of the attitude pitch variation, by observing through an aperture in the casing, the relative position of said model and of said numbered generatrices of the body of revolution.

These improvements, which apply more particularly to gyroscopic horizons mounted on the instrument panel of aircraft likely to be subjected to considerable variations in their attitude pitch, do not substantially increase the bulk of said horizons. Moreover they enable the pilot to observe the variations of the attitude pitch of the aircraft on a larger scale.

The following examples will bring out further features and advantages of the invention and will facilitate its comprehension. These examples relate to embodiments of these improvements, with reference to the accompanying diagrammatic drawings in which.

Figure 1:
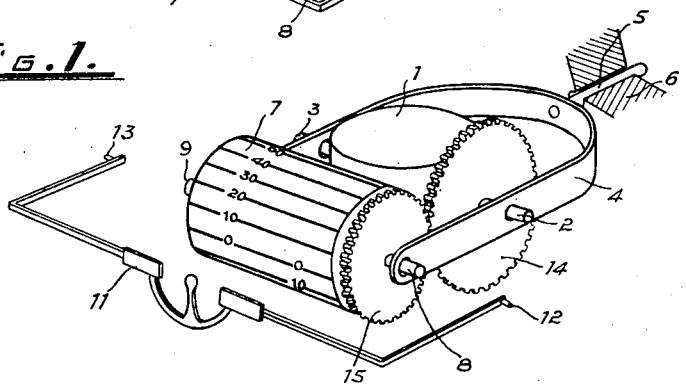
FIGURE 1 is a perspective view of a first embodiment of the improvements according to the invention.

With reference to FIGURE 1, the horizon gyroscope 1 can pivot about trunnions 2 and 3, supported in the arms of the half gimbal ring 4, pivoting about a trunnion 5 within the casing 6. The straight generatrix cylinder 7, located in front of the horizon gyroscope 1 between the arms of the fork formed by the extended ends of the half gimbal ring 4, can pivot about trunnions 8 and 9 supported by the said extended arms. The central part of the cylinder 7 is located in front of the aperture provided in the casing wall of the gyroscope horizon. For the sake of clarity, this aperture is not shown on any of the figures. The model 11, which is visible by the pilot through the casing opening, is mounted on pivots 12 and 13 in such a manner that the pilot is able to adjust the height of the model.

A toothed wheel 14, secured to the trunnion 2 of the horizon gyroscope 1, meshes with a toothed wheel 15 secured to the trunnions 8 of the cylinder 7.

Generatrices are drawn on the outer surface of the cylinder 7, the generatrix located in the true horizontal plane containing the trunnions 2 and 3 of the horizon gyroscope 1, when pitching is nil, is graduated as 0; it constitutes the conventional horizon line. Generatrices located above this 0 line are graduated as 10, 20 etc., these numbers being inscribed on the left-hand side of the cylinder 7, while generatrices located below said 0 line are marked with the same symmetrical graduations, these being inscribed on the right-hand side of the cylinder 7. In the particular instance of FIGURE 1, the number on the scale corresponds to the value of the pitch angle; thus the graduation scale ranges from −85° to +85°.

Whenever an increase of the spacing between the cylinder 7 and the gyroscope 1 is required, intermediary gears may be interposed between the toothed wheels 14 and 15.

Figure 2:
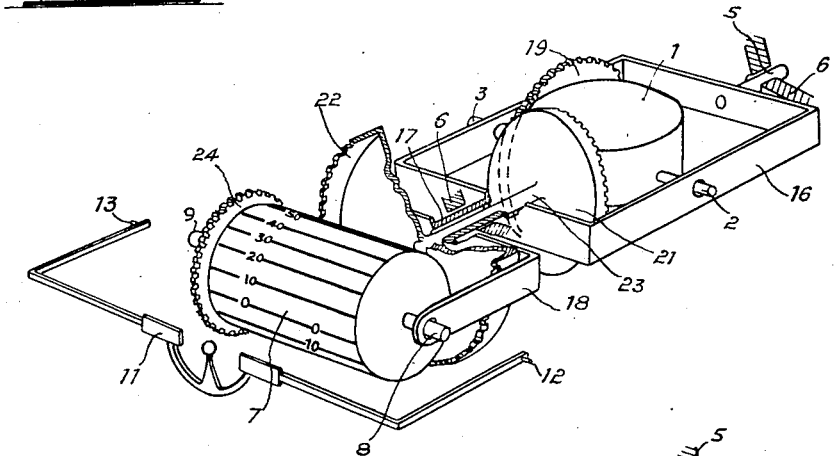
FIGURE 2 is a perspective view of a second embodiment of the improvements.

The embodiment of FIGURE 2 is somewhat different from that just described in that the half-gimbal ring 4 is replaced by a whole gimbal ring 16, which is rollingly pivoted about two trunnions 5 and 17, the trunnion 17 being hollow.

The fork 18, in the prongs of which rotate the trunnions 8 and 9 of the rotating cylinder 7, is integral with the ring of the gimbal-ring 16, as it is secured to the hollow trunnion 17 supported in turn by the casing 6.

The means for transmitting the pitch variations of the aircraft to the cylinder 7 pivoting around its spindle, comprise in this instance, a toothed wheel 19 secured to the trunnion 3 of the gyroscope 1, two bell-shaped toothed wheels 21 and 22 secured to the shaft 23 which passes through the hollow part of the trunnion 17 of the gimbal-ring 16, said wheels being respectively located on either side of the said trunnion 17, and a toothed wheel 24 secured to the trunnion 9 of cylinder 7, all these toothed wheels meshing with one another in such a way that the wheel 24 is driven by the wheel 19.

Figure 3:
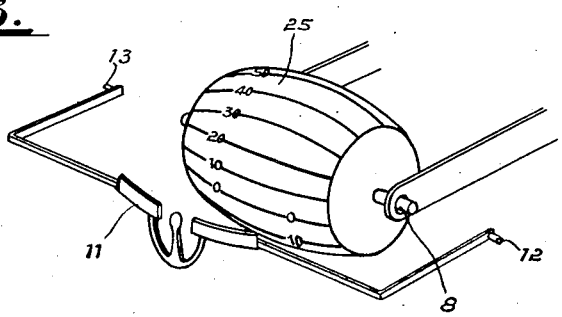
FIGURE 3 is a perspective view of a particular form of the cylinder of revolution.

In FIGURE 3, the generatrices on the body of revolution 25 are arcs of a circle, the model 11 likewise having the shape of an arc of a circle. The advantage of such an arrangement is to increase the similtude between the view seen by the pilot on the improved gyroscopic horizon according to the invention, and that seen on a horizon, of the aforesaid conventional type.

The operation of the improved gyroscopic horizon, according to the invention, is as follows:

During horizontal flight, the horizon gyroscope is vertical, and the pilot can see the model 11 on the generatrix marked 0 on the cylinder 7, in the horizontal diametral plane of the casing aperture. This generatrix 0 corresponds to the conventional horizon-line.

In case the pitch angle of the aircraft changes, and becomes for example negative, the cylinder 7 rotates about its trunnions 8 and 9, such rotation being due to the toothed wheel 14 actuating the toothed wheel 15 which, in the embodiment shown in FIGURE 1, is secured to the cylinder 7 or due to the action of the toothed wheels 19, 21 and 22 actuating the wheel 24 in the embodiment shown in FIGURE 2. Accordingly, the model 11 registers with one of the generatrices bearing marks on the left side of the cylinder, or is projected between two such generatrices. In either case, the pilot can not only at once realize what is the attitude of the aircraft but he can also ascertain what is the value of the pitch angle, either by direct reading or by an easy interpolation.

Should such pitch variation be combined with a roll variation, the generatrices will be tilted in relation to the model, as with the conventional horizon line.

But whatever the attitude of the aircraft may be, and as long as the pitch variations are confined within the $-85°$ to $+85°$ range, the respective position of the model and of the cylinder generatrices can be seen in the casing aperture as would be the case with an ordinary gyroscopic horizon so that, when using the improved gyroscopic horizon of the invention, the pilot will instinctively perform the same operations as before, in order to keep the aircraft in horizontal flight or tilted at a given angle, so long as the pitch variations remain within the $-85°$ and $+85°$ limit.

According to a further particularly useful feature of the invention, it is furthermore possible in order to make easier the reading to so select the reduction ratio between the pitching movement of the horizon gyroscope and the movement of rotation of the cylinder of revolution 7 about its axis that the angle of rotation of said cylinder is larger than the pitching angle. Besides, as the variations of these angles are kept in a mutually constant ratio, the pilot has at his disposal a permanent scale for measuring the pitch variations within the $-85°$ to $+85°$ range.

The embodiment of FIG. 2 has the following advantage over the embodiment of FIG. 1. The prongs of fork 18 do not support the weight of the horizon gyroscope 1, since the said fork is connected to the ring of the said horizon gyroscope by means of the trunnion 17 which constitutes one of the roll trunnions. Such a design enables the gravity forces due to the suspended masses to be equally distributed on the gimbal ring bearings, and so, reduces to a minimum the load applied to these bearings and consequently the friction torques which disturb the operation of the gyroscope. It is also to be noted that spindle 23, which connects two elements of the gear mechanism provided between the horizon gyroscope 1 and the cylinder 7, allows a complete freedom of rotation of said gyroscope about its roll axis.

It is to be understood that the present invention has been described and illustrated merely by way of example without any intention to limit same, and that alterations of detail can be made without departing from the spirit of the invention.

What I claim is:

In a gyroscopic horizon instrument for mounting on an aircraft instrument panel and having an apertured casing, a horizon bar adapted to be viewed through the aperture, a horizon gyroscope supported by a gimbal ring in the casing, means supporting said gimbal ring for rotation about a roll axis, a hollow journal shaft supported by the casing, fixedly connected with said gimbal ring and extending along the roll axis of said horizon gyroscope toward said horizon bar for rotation about the roll axis, a fork mounted on said shaft, a spindle journalled across the prongs of said fork parallel to the pitch axis of said horizon gyroscope, a body of revolution on said spindle and coaxial therewith and having on the outer surface thereof a plurality of numbered generatrices, a first toothed wheel secured to the spindle of the cylinder, a second toothed wheel secured to the pitch spindle of the horizon gyroscope, and third and fourth toothed wheels respectively secured to the extremities of a spindle passing coaxially through said hollow journal shaft, said third and fourth toothed wheels meshing respectively with the first and second toothed wheels, whereby a definite value of the rotation of the cylinder about its axis will correspond to any given variation of the aircraft pitch-angle, the aircraft attitude being indicated regardless of the amount of the variation of the pitch angle by the relative position of the horizon bar.

References Cited in the file of this patent
UNITED STATES PATENTS

| | | |
|---|---|---|
| 2,167,422 | Langgasser | July 25, 1939 |
| 2,450,874 | Braddon | Oct. 12, 1948 |
| 2,492,992 | Handel | Jan. 3, 1950 |
| 2,566,305 | Beacom | Sept. 4, 1951 |
| 2,747,293 | Lyons | May 29, 1956 |